(12) United States Patent
Matysiak et al.

(10) Patent No.: US 10,719,275 B2
(45) Date of Patent: Jul. 21, 2020

(54) METHODS AND SYSTEMS FOR DETECTING AND FORMATTING SENSITIVE INFORMATION IN A MULTI-FUNCTION PRINTER THROUGH NATURAL LANGUAGE TEXT OR VOICE MESSAGES

(71) Applicant: Kyocera Document Solutions Development America, Inc., Concord, CA (US)

(72) Inventors: Jacek Joseph Matysiak, Concord, CA (US); Dilinur Wushour, Concord, CA (US)

(73) Assignee: Kyocera Document Solutions Development America, Inc., Concord, CA (US)

( * ) Notice: Subject to any disclaimer, the term of this patent is extended or adjusted under 35 U.S.C. 154(b) by 28 days.

(21) Appl. No.: 15/936,701

(22) Filed: Mar. 27, 2018

(65) Prior Publication Data
US 2019/0303056 A1 Oct. 3, 2019

(51) Int. Cl.
*G06F 3/12* (2006.01)
*G06K 9/00* (2006.01)

(52) U.S. Cl.
CPC .......... *G06F 3/1206* (2013.01); *G06F 3/1219* (2013.01); *G06F 3/1238* (2013.01); *G06F 3/1246* (2013.01); *G06F 3/1292* (2013.01); *G06K 9/00463* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 7,528,981 B2 * | 5/2009 | Johnson | G03G 15/5079 358/1.15 |
| 9,104,344 B2 * | 8/2015 | Ganesan | G06F 3/1207 |
| 9,432,527 B2 | 8/2016 | Park et al. | |
| 2004/0126167 A1 * | 7/2004 | Roosen | G06F 3/1211 400/76 |

(Continued)

OTHER PUBLICATIONS

U.S. Appl. No. 15/936,653, filed Mar. 27, 2018, Matysiak et al.

(Continued)

*Primary Examiner* — Mohammad H Ghayour
*Assistant Examiner* — Pawan Dhingra
(74) *Attorney, Agent, or Firm* — Sheridan & Ross P.C.

(57) ABSTRACT

Embodiments provide for controlling functions of a Multi-Function Printer (MFP) by receiving, from one or more servers, a text or voice message expressed in natural language and received by the one or more servers from a mobile device of the user of the MFP, extracting text data or audio data of the received text or voice message, forwarding the extracted text data or audio data of the received text or voice message to the one or more servers, receiving, from the one or more servers, information indicating a language type for one or more portions of text within a document, dynamically adapting content of the document based on the language type for the one or more portions of text or content of the document, and performing one or more functions using the dynamically adapted content of the document.

20 Claims, 6 Drawing Sheets

(56) References Cited

U.S. PATENT DOCUMENTS

| | | | |
|---|---|---|---|
| 2006/0045544 A1* | 3/2006 | Kim | G03G 15/5075 |
| | | | 399/8 |
| 2006/0190537 A1* | 8/2006 | Morris | G06Q 10/10 |
| | | | 709/204 |
| 2009/0207449 A1 | 8/2009 | Johnson et al. | |
| 2010/0046015 A1* | 2/2010 | Whittle | G06F 3/1222 |
| | | | 358/1.9 |
| 2012/0218589 A1* | 8/2012 | Watanabe | G06F 3/1205 |
| | | | 358/1.15 |
| 2013/0070273 A1* | 3/2013 | Nagata | H04N 1/00204 |
| | | | 358/1.13 |
| 2014/0320888 A1* | 10/2014 | Baek | G06F 21/335 |
| | | | 358/1.14 |
| 2015/0055171 A1* | 2/2015 | Joo | G06F 3/00 |
| | | | 358/1.15 |
| 2015/0172505 A1* | 6/2015 | Park | H04N 1/00307 |
| | | | 358/1.15 |
| 2016/0050263 A1* | 2/2016 | Hwang | H04L 51/04 |
| | | | 709/206 |
| 2016/0050326 A1* | 2/2016 | Lee | H04N 21/2223 |
| | | | 358/402 |
| 2016/0330336 A1 | 11/2016 | Park et al. | |
| 2018/0075254 A1* | 3/2018 | Reid | G06F 21/6245 |
| 2019/0050738 A1* | 2/2019 | Sivagnanam | G06N 3/006 |

OTHER PUBLICATIONS

U.S. Appl. No. 15/936,736, filed Mar. 27, 2018, Matysiak et al.
Official Action for U.S. Appl. No. 15/936,653, dated Oct. 9, 2018, 14 pages.

* cited by examiner

# METHODS AND SYSTEMS FOR DETECTING AND FORMATTING SENSITIVE INFORMATION IN A MULTI-FUNCTION PRINTER THROUGH NATURAL LANGUAGE TEXT OR VOICE MESSAGES

FIELD OF THE DISCLOSURE

Embodiments of the present disclosure relate generally to methods and systems for controlling functions of a multi-function printer and more particularly to natural language access to and control of functions for detecting and selectively removing or reformatting sensitive or other information in a printed or scanned document.

BACKGROUND

Multi-Function Printers (MFPs) are common and well-known pieces of office equipment and can be found in most, if not all, offices and libraries, and even in many homes. These devices can offer the ability to print, scan, fax, and otherwise process documents in a wide variety of formats. While useful and convenient, these devices also create an avenue through which sensitive, private, or other controlled information can be compromised. For example, a user might print a document that includes financial information for a company that is considered to be confidential. Once printed, especially if the user printing the document does not retrieve it from the MFP quickly, this document and the information therein can be obtained by other users who may not be authorized to have that information. Similarly, a user may scan a document containing private information such as a social security number, bank account or credit card numbers, healthcare information, etc. Once scanning into electronic form, this document and the information is at risk of being copied and distributed to persons who should not have access to this information and who may misuse it, for example, to commit identity theft etc.

In other cases, documents being printed or scanned may be in a format that, while convenient to read in one form, are wasteful or inefficiently uses the space consumed by that content. For example, a document in electronic form may be formatted to present in a slideshow or on a webpage where widely spaced content is easier to read. However, when printed, this format contains significant amounts of blank space which is wasteful of paper. Hence, there is a need for improved methods and systems for conveniently detecting content in a printed or scanned document and dynamically formatting that content to control the information therein.

BRIEF SUMMARY

According to one embodiment, an MFP can comprise a processor and a memory coupled with and readable by the processor. The memory can have stored therein a set of instructions which, when executed by the processor, causes the processor to control functions of the MFP by connecting via a network with one or more servers providing a cloud service and receiving, from the one or more servers, a text or voice message expressed in natural language. The text or voice message can be received by the one or more servers from a mobile device of the user of the MFP. Text data or audio data of the received text or voice message can be extracted and forwarded to the one or more servers. In response, information indicating a language type for one or more portions of text within a document can be received from the one or more servers. Content of the document can be dynamically adapted based on the language type for the one or more portions of text or content of the document and one or more functions can be performed using the dynamically adapted content of the document.

According to another embodiment, a system can comprise a mobile device, one or more servers communicatively coupled with the mobile device, and an MFP communicatively coupled with the mobile device and the one or more servers. The mobile device can send a natural language text or voice message to the one or more servers requesting initiation of one or more functions of the MFP. The one or more servers can receive the natural language text or voice message from the mobile device, open a connection with the MFP, and forward the natural language text or voice message received from the mobile device to the MFP. The MFP can receive the natural language text or voice message forwarded from the one or more servers, extract text data or audio data of the received text or voice message, and forward the extracted text data or audio data of the received text or voice message to the one or more servers. The one or more servers can receive the text or audio data from the MFP, perform natural language processing on the text or audio data to generate information indicating a language type for one or more portions of text within a document, and forward the generated information to the MFP. The MFP can receive the information indicating a language type for one or more portions of text within the document from the one or more servers, dynamically adapt content of the document based on the language type for the one or more portions of text or content of the document, and perform one or more functions using the dynamically adapted content of the document.

According to yet another embodiment, a method for controlling functions of an MFP can comprise receiving, by one or more servers, a natural language text or voice message from a mobile device, the text or voice message requesting initiation of one or more functions of the MFP. A connection with the MFP can be opened by the one or more servers and the natural language text or voice message received from the mobile device can be forwarded by the one or more servers to the MFP. The natural language text or voice message from the one or more servers can be received by the MFP. Text data or audio data of the text or voice message can be extracted by the MFP and the extracted text data or audio data of the received text or voice message can be forwarded by the MFP to the one or more servers. The text data or audio data from the MFP can be received by the one or more servers and natural language processing can be performed on the text data or audio data by the one or more servers to generate information indicating a language type for one or more portions of text within a document to. The generated information can be forwarded by the one or more servers and received by the MFP. Content of the document can be dynamically adapted by the MFP based on the language type for the one or more portions of text or content of the document and one or more functions can be performed by the MFP using the dynamically adapted content of the document.

Figure 1:
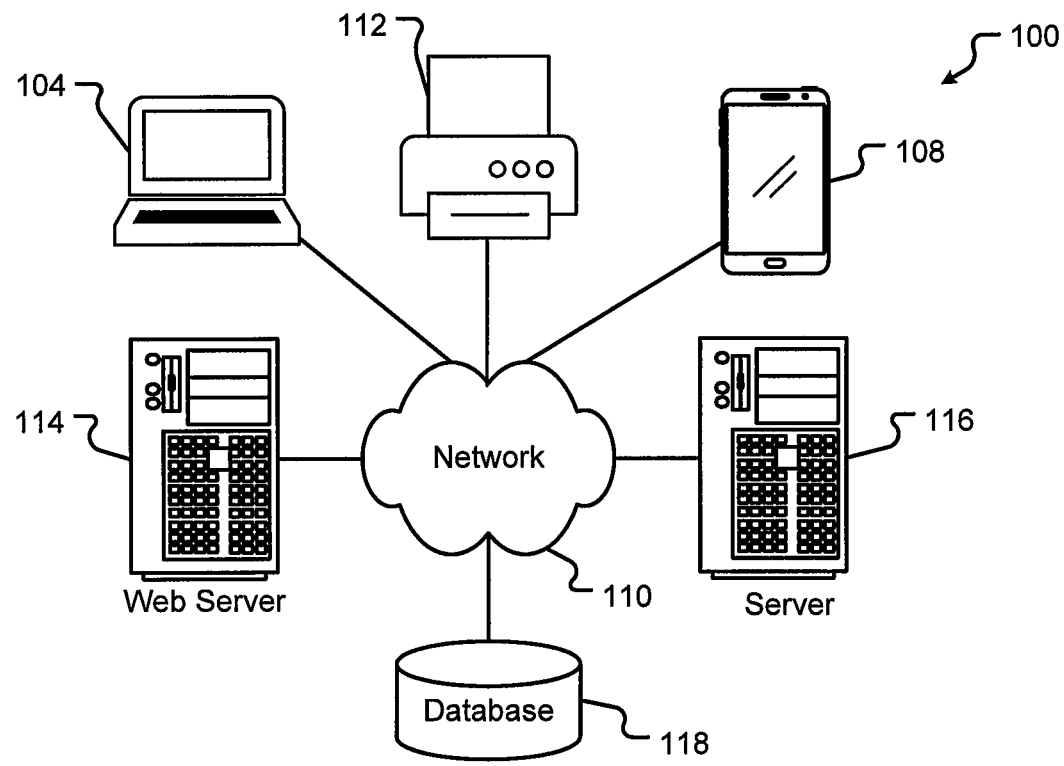
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices 104, 108, and 112, such as a computing device 104, a mobile device 108, and/or Multi-Function Printer (MFP) 112. The computing devices, such as computing device 104, may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. The computing devices 104, 108, and 112 may also have any of a variety of applications, including for example, database client and/or server applications, and web browser applications. Additionally, or alternatively, the computing devices, such as mobile device 108 may be any other electronic device, such as a thin-client computer, Internet-enabled mobile telephone, and/or personal digital assistant, capable of communicating via a network 110 and/or displaying and navigating web pages or other types of electronic documents. MFP 112 can comprise any of a variety of devices offering printing, scanning, copying, faxing, and/or other functions of processing documents. Examples of such devices can include, but are not limited to, the ECOSYS line of MFPs provided by KYOCERA Document Solutions Inc. Although the exemplary computer environment 100 is shown with two computing devices, any number of user computers or computing devices may be supported.

Environment 100 further includes a network 110. The network 110 can be any type of network familiar to those skilled in the art that can support data communications using any of a variety of commercially-available protocols, including without limitation SIP, TCP/IP, SNA, IPX, AppleTalk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish available operations as one or more web services.

The environment 100 may also include one or more file and/or application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server(s) 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 114 or 116 may also include database servers, including without limitation those commercially available from Oracle®, Microsoft®, Sybase®, IBM® and the like, which can process requests from database clients running on a computing device 104, 108, 112.

The web pages created by the server(s) 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer devices 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
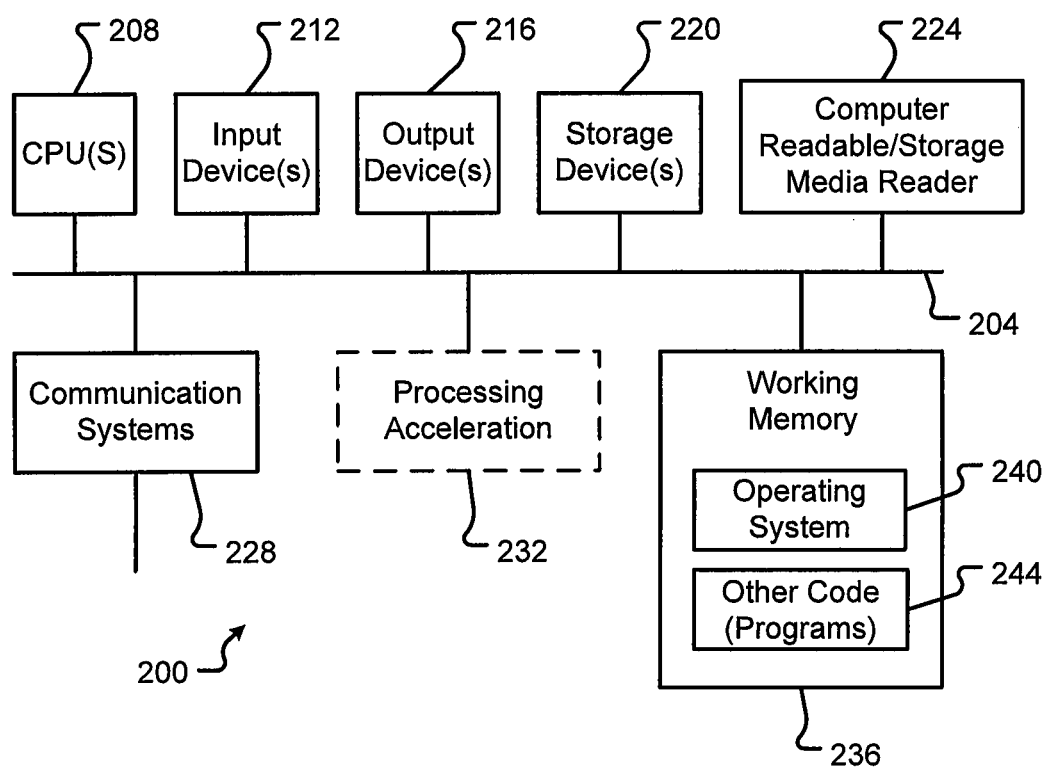
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices 104, 108, and 112, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read-only memory (ROM), random-access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
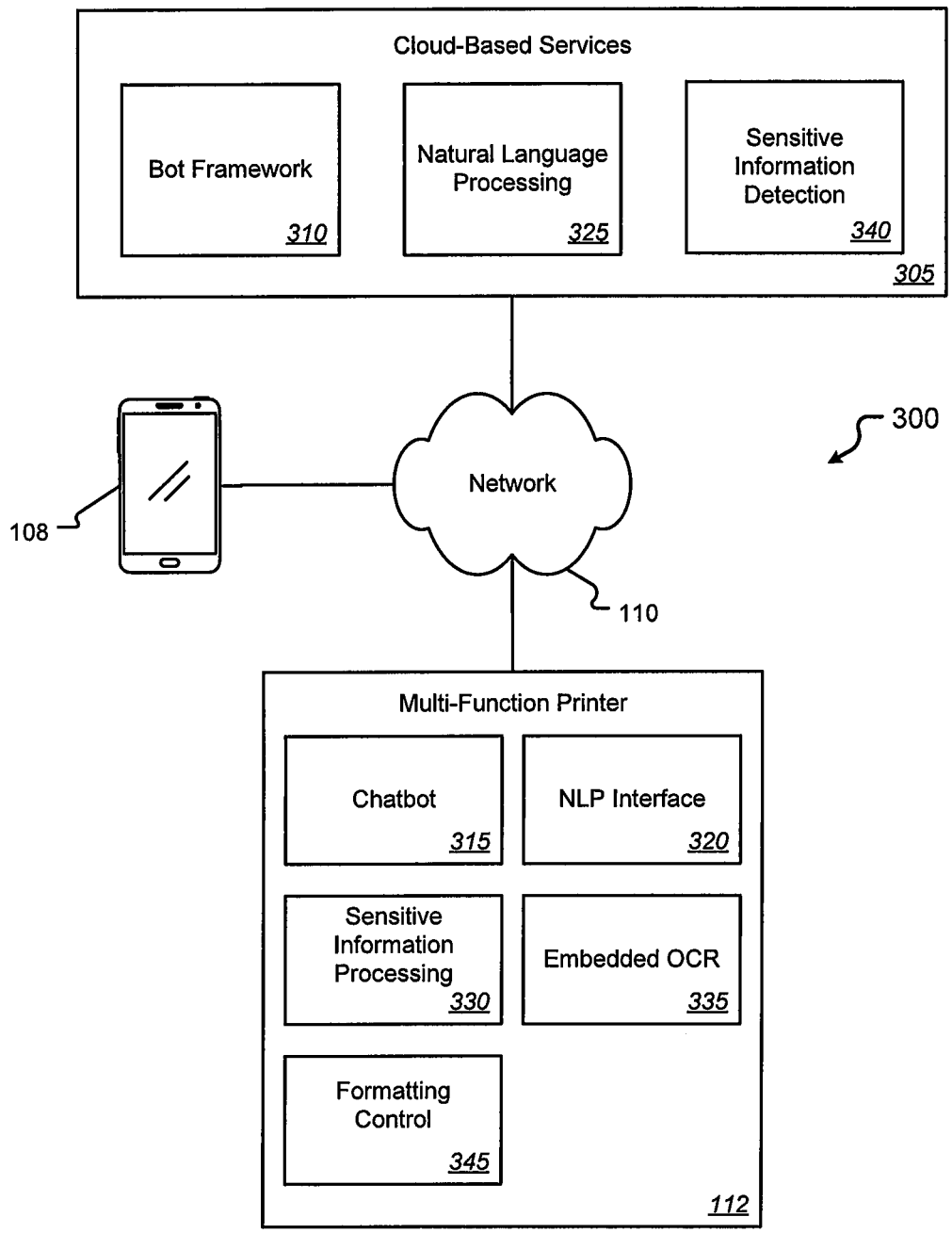
FIG. 3 is a block diagram illustrating components of a system for detecting and formatting sensitive information in a multi-function printer according to one embodiment of the present disclosure.

FIG. 3 is a block diagram illustrating components of a system for detecting and formatting sensitive information in an MFP according to one embodiment of the present disclosure. As illustrated in this example, the system 300 can include a mobile device 108, communication network 110, and MFP 112 as introduced above. As noted, the mobile device 108 can comprise a cellular telephone, smartphone, tablet, or similar mobile device capable of communicating wirelessly with one or more communication networks to send and receive messages including but not limited to Short Message Service (SMS) and/or Multimedia Message Service (MMS) text messages, Instant Messages (IMs) voice messages, messages directed to or through various social media networks, data-based messages and exchanges, etc. The network 110 can include but is not limited to WiFi, cellular, any one or more wired and/or wireless local-area and wide-area networks, the Internet, etc. As also noted, MFP 112 can comprise any of a variety of devices offering printing, scanning, copying, faxing, and/or other functions of processing documents such as the ECOSYS line of MFPs provided by KYOCERA Document Solutions Inc, for example. The system can also include one or more cloud-based services executing on one or more servers 114 or 116 as described above also coupled with the network 110.

Generally speaking, embodiments of the present disclosure provide for natural language access to and control of functions for detecting and selectively removing or reformatting sensitive or other information in a printed or scanned document. Functions of the MFP can include, but are not limited to, any one or more of printing, scanning, copying, faxing, etc. As noted above, the use of the conjunction "or" as used herein is intended to be inclusive and should not be considered to mean or imply a logical exclusive or condition. Rather, any reference made herein to functions of the MFP, such as printing and/or scanning, should be considered to include either or both of these functions as well as any other possible functions provided by the MFP, alone or in combination. Using the mobile device 108 a user can interact with the MFP 112 through a sequence of natural language text and/or voice messages. For example, the user can communicate through the mobile device 108 with the MFP 112 via a chat session, e.g., text message, voice, multiple-choice bubble, etc. Through such a chat session, the user can access functions of the MFP to simplify printing and scanning. Furthermore, the MFP 112 can be adapted to detect certain information in the document and dynamically reformat the document based on that detected information. For example, the information can comprise secret, confidential, or other sensitive information, blank pages, excess carriage returns, or other blank space, etc. Through the chat session between the mobile device 108 and MFP 112, the user can be informed and provided with options for formatting the document to control this detected information.

More specifically, the MFP 112 can further comprise a chatbot 315. As known in the art and as the term is used herein, a chatbot 315 is an application that, when executed by a processor such as found in the MFP 112, can simulate a natural conversation with a human user. The chatbot 315 of the MFP 112 can conduct such a conversation with the user of the MFP 112 over the network 110 and through the mobile device 108 of that user. The conversation can be text-based, e.g., SMS, MMS, IM, or similar messages, or voice-based, e.g., a voice call, and can be directed to accessing and controlling the functions of the MFP 112. In this way, the user can easily and naturally interact with and control the MFP 112 without the need to utilize the typical menu selections and other controls of the MFP 112 and, in some cases, without even being physically present at or near the MFP 112.

The cloud-based services 305 can execute one or more applications supporting these functions. For example, chatbots typically utilize natural language processing to conduct conversations with human users. This processing can be done by the MFP 112 or, in some cases, some or all of this processing may be performed by the cloud-based services 305. Accordingly, the cloud-based services 305 can, according to one embodiment, execute a bot framework 310 and/or one or more Natural Language Processing (NLP) applications 325 or functions. The NLP applications 325 can comprise any one or more applications or functions as known in the art and commonly used for processing and interpreting text data or audio data containing written or spoken expressions in a natural language form. The bot framework 310 can comprise one or more applications, functions, and/or interfaces to support interworking between the chatbot 315 and the NLP applications 325. Similarly, the MFP 112 may include one or more NLP interface 320 functions for interworking with the NLP applications 325 of the cloud-based services 305. In some cases, these functions 320 can pre-process text and/or voice messages, e.g., to extract text data or audio data from received messages and provide that data to the cloud-based services 305 for further processing by the NLP applications 325. It should be understood that, in other implementations, the NLP applications 325 may be executed locally by the MFP 112. In such cases, the cloud-based services 305 may not be implemented or may perform additional or different functions. Regardless of exactly where or how the NLP processing is performed, the chatbot 315 can allow the user to access and control the printing and/or scanning functions of the MFP 112. For example, the user can request through the mobile device 108 the printing and/or scanning functions to retrieve and print a particular document or scan a particular document.

As introduced above, the MFP 112 can be adapted to detect certain information in the document and dynamically reformat the document based on that detected information. For example, the information can comprise secret, confidential, or other sensitive information. The term sensitive information as used herein refers to any information of a type that is predetermined to be subject to control to prevent that information from being disclosed to persons or entities other than the user of the MFP or other properly authorized persons or entities. Examples of such sensitive information can include, but are not limited to, financial, human resource, planning, engineering, and other information of a corporation or similar entity, bank account information, credit card numbers, health care information, social security information, tax information, and other, similar personal information of an individual, etc. Another example of sensitive information can be currency. That is, embodiments can detect and prevent the attempted printing, scanning, and/or copying of currency. Additionally, or alternatively, other information can be detected and controlled. For example, blank pages, excess carriage returns, or other blank space, etc. can be detected and the document can be reformatted to eliminate or reduce such blank space.

Accordingly, the MFP 112 can further comprise one or more sensitive information processing applications 330 executing therein. According to one embodiment, these applications 330 of the MFP 112 can be adapted to work in conjunction with one or more sensitive information detection applications 340 of the cloud-based services 305. For example, the sensitive information detection applications 340 of the cloud-based services 305 can be adapted to execute and/or apply one or more heuristics, algorithms, rules, etc. that define and/or recognize information of one or more types predefined to be sensitive. These detected language types can then be indicated to the sensitive information processing applications 330 of the MFP which can then, together with embedded Optical Character Recognition (OCR) functions 335 and/or formatting control functions 345, remove the detected information and/or reformat the document accordingly.

As described above, the MFP 112 can extract and forward to the cloud-based service 305 text data or audio data of the text or voice message received from the mobile device 108. As noted above, the use of the conjunction "or" as used herein is intended to be inclusive and should not be considered to mean or imply a logical exclusive or condition. Rather, any reference made herein to text or voice messages should be considered to include either or both of text and/or voice, alone or in combination. Generally speaking, text data can comprise, for example, a text string corresponding to and including a command or request for functions of the MFP and can identify a document to be printed, a destination to which a scanned document is to be sent, etc. Similarly, audio data can comprise an audio clip corresponding to and including such a command or request and the source document, destination, etc. The cloud-based service 305 can receive the text data or audio data from the MFP 112 and the NLP applications 325 together with the sensitive information detection applications 340 can process on the text data or audio data of the message as well as the subject document to generate information indicating a language type for one or more portions of text within the document. The language type information can then be forwarded to the MFP 112.

For example, the text data or audio data can be processed by the NLP applications 325 to determine or identify an MFP function to be performed, e.g., print, scan, copy, fax, or any other one or more functions of the MFP, alone or in combination, and a document upon which it is to be performed, a destination to which the document is to be sent, etc. Based on this determination, sensitive information can be detected by further processing the subject document by the sensitive information detection applications 340. This further processing can comprise, for example, searching a language-specific dictionary of keywords identifying sensitive information, applying one or more heuristics, algorithms, rules, etc. defining and identifying information that is subject to some level of control, i.e., is sensitive, private, controlled, etc. In such cases, the identified sensitive information can be tagged with metadata or otherwise marked to indicate that content is sensitive information. This indication of language type can then be provided to the MFP 112. In other embodiments, this information can be provided to the MFP 112 and can comprise, for example, a dictionary of keywords identified as sensitive or rules defining sensitive information which can be applied by the sensitive information processing applications 330 of the MFP 112 to identify sensitive information, heuristics which can be applied and/or algorithms which can be executed by the sensitive information processing applications 330 of the MFP 112 to detect sensitive information, etc.

According to one embodiment, when sensitive information is detected, an alert can be provided by the chatbot 315 to the user about the sensitive information for privacy concerns. This alert can inform the user through the chat interface and mobile device 1008. This notice, or a following message in the chat session, can also provide options to look up relevant information like company security policies or currency copying policies. For example, the chat messages can ask the user if they would like to know more about how to prevent this or know why it's not allowed and present FAQ style information. Additionally, or alternatively, an alert can be provided to a designated person other than the direct user of the MFP 112 such as a supervisor, administrator, or manager when a scan, copy, or print is attempted with sensitive information. In such cases, the functions can be halted pending approval and allowed to continue when notified person approves and permits the functions. For example, a scan or print job containing social security numbers could be halted and allowed to continue only after a supervisor approves it via chat.

According to one embodiment, this notification can comprise a three-way chat in which designated user, i.e., supervisor, administrator, manager, etc., can ask the user of the MFP for more details, e.g., to verify their identity. In other words, a live challenge question could be asked such as "What did you order the last time we had lunch." Biometrics like fingerprints can be forged via a photo and using three-dimensional printing. So, asking challenge questions or conducting a conversation allows for more verification.

As introduced above, the sensitive information processing applications 330 can remove detected sensitive information from printed or scanned documents. According to one embodiment, different logic can be applied for detecting and removing sensitive information based on the locale, language, country, user, or even different document types such as driver license, credit cards, social security cards, tax form, etc. For example, structured data like tax forms can be preset for detection and removal of identified information.

In addition to, or instead of detecting and removing sensitive information, the sensitive information processing applications 330 can detect blank pages or blank spaces and remove them to compact data and save paper. For example, the embedded OCR 335 of the MFP 112 can apply pattern recognition to detect blank areas. It should be understood that, generally, OCR is used for text recognition but may be adapted to detect primarily spaces or blank areas without text. However, in other examples, other methods for detecting blank space as known in the art may be used. The sensitive information processing applications 330 can then perform one or more document reformatting operations such as deleting, moving/shifting, or reorder content on the page to fill the detected blank spaces. The sensitive information processing applications 330 can additionally or alternatively fit the content to the page by automatically scaling or moving the context/images around or removing empty spaces and regenerating the print job by calculating the scaling factor and applying scaling commands.

It should be noted and understood that while only one MFP 112, mobile device 108, and cloud-based service 305 are illustrated and described here for the sake of brevity and clarity, any number of such components may be used in any particular implementation. For example, in an office environment where an MFP 112 according to embodiments of the present disclosure can typically be found, multiple users can share such a device. Therefore, any number of mobile devices 108 may be present and can interact with the MFP 112 as described above. Similarly, such an environment may include more than one MFP 112 and each mobile device 108 may be able to interact with each MFP 112 or may be limited to interacting with only one or a few MFPs 112 for which the user associated with that mobile device 108 is authorized. In various implementations, any number of mobile devices 108 and MFPs 112 may utilize one or more cloud-based services 305 or, as noted above, the natural language processing 325 and other functions of the cloud-based services 305 may be fully implemented in each MFP 112 without relying on such remote services 305. When utilized, the cloud-based services 305 and servers providing those services 305 may be physically and/or logically organized and distinguished, for example, based on models or types of MFPs supported, languages supported, geographic regions or customers supported, or any of a number of other factors upon which the servers and other resources of the cloud-based services 305 may be distributed and the workloads of resources may be balanced. Numerous other variations are contemplated and considered to be within the scope of the present disclosure.

Figure 4:
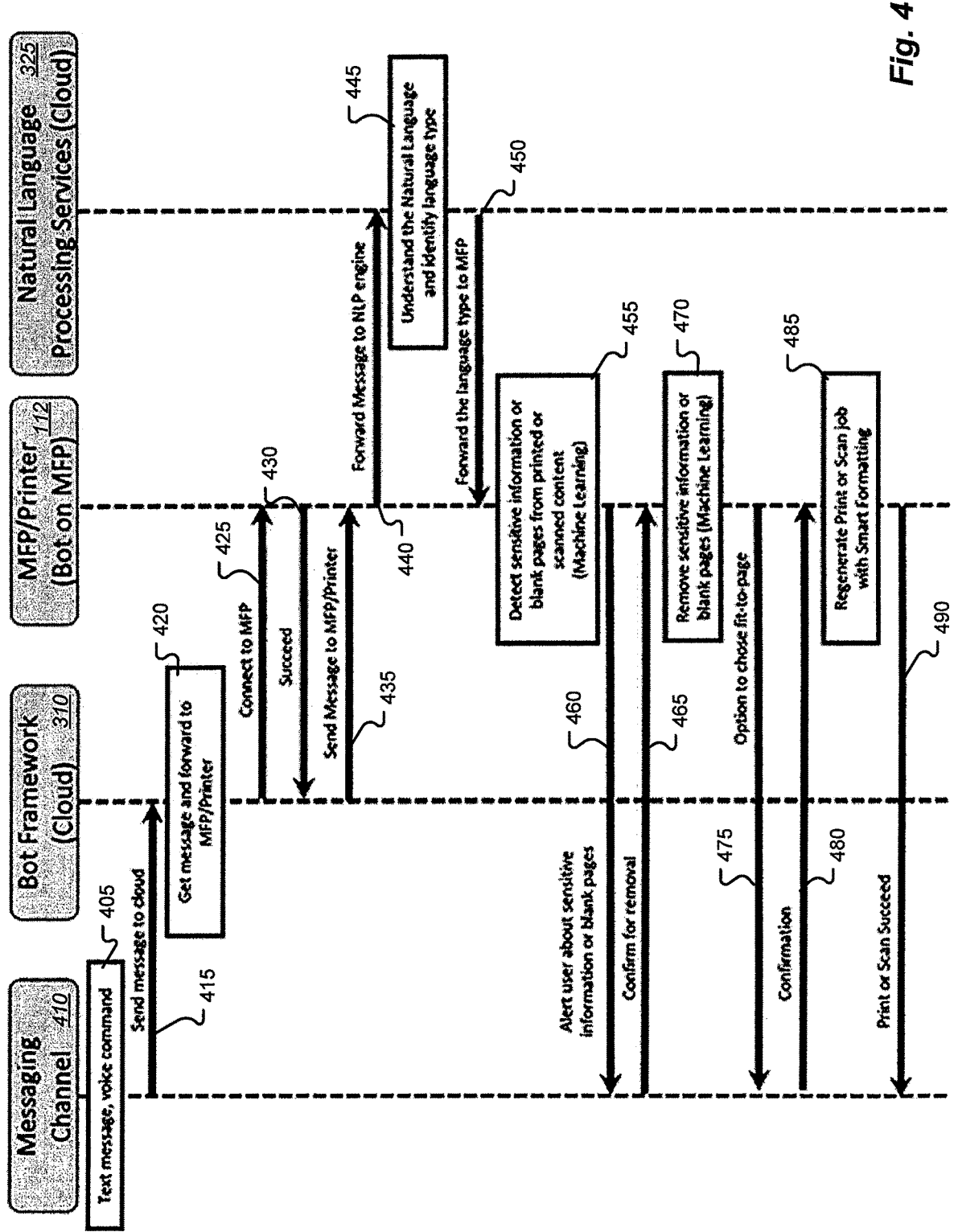
FIG. 4 is a timing diagram illustrating an exemplary process for detecting and formatting sensitive information in a multi-function printer according to one embodiment of the present disclosure.

FIG. 4 is a timing diagram illustrating an exemplary process for detecting and formatting sensitive information in an MFP according to one embodiment of the present disclosure. At step 405, as illustrated in this example, accessing functions of a multi-function printer can begin with a text or voice message on a messaging channel 410, e.g., sent from the mobile device 108 over the network 110. At step 415, the message can be sent to the cloud-based services 305. At step 420, the message can be received by the bot framework 310 as described. At step 425, the bot framework can then open a connection with the MFP 112, e.g., by sending a connection message to the MFP. At step 430, the MFP 112 can reply with an acknowledgement or other success message once the connection is established. At step 435, the bot framework can then send the received message to the chatbot 315 of the MFP 112.

The chatbot 315 can receive the text or voice message sent from the bot framework 310 of the cloud-based services 305 and process the message in a variety of different ways depending upon the exact implementation. At step 440, according to one embodiment, the chatbot 315 can forward the received message to the NLP applications 325 of the cloud-based services 305. In another embodiment, the chatbot 315 may perform some amount of processing on the received text or voice message such as, for example, extracting portions of text data or audio data from the message, before forwarding those portions to the NLP applications 325. In yet other embodiments, the MFP 112 may perform all NLP processing locally and thus, the text or voice message or text or audio data from the message does not need to be forwarded to NLP application 325 elsewhere.

At step 445, the NLP applications 325 can perform processing to understand the natural language expressed in the forwarded message and resolve the natural language into intents and entities. For example, the text data or audio data can be processed according to one or more NLP functions to determine or identify an MFP function to be performed, e.g., print, scan, copy, fax or any other one or more functions, alone or in combination, and a document upon which it is to be performed, a destination to which the document is to be sent, etc. Based on this determination, sensitive information can be detected by further processing the subject document by the NLP applications 325 and/or sensitive information detection application 340 of the cloud-based services 305. This further processing can comprise, for example, applying one or more heuristics, algorithms, rules, etc. defining and identifying information that is subject to some level of control, i.e., is sensitive, private, controlled, etc. In such cases, the identified sensitive information can be tagged with metadata or otherwise marked to indicate that content is sensitive information. At step 450, this indication of language type can then be provided 450 to the MFP. In other embodiments, this information provided to the MFP can additionally or alternatively comprise, for example, a dictionary of keywords identified as sensitive, rules defining sensitive information or which can be applied by the MFP to identify sensitive information, heuristics which can be applied and/or algorithms which can be executed by the MFP to detect sensitive information, etc.

At step 455, regardless of the exact form, the information indicating a language type for one or more portions of text within a document can be received by the MFP 112 and can be applied by the MFP 112 to detect or identify sensitive information. At step 460, an alert can be provided through the messaging channel 410 to the mobile device of the user of the MFP 112 indicating that the at least one portion of text within the document identified as sensitive information and/or blank spaces has been detected. For example, an alert message such as an SMS, MMS, IM, or other such message may be sent to the mobile device of the user indicating that sensitive information such as a social security number or company secret information has been detected and will be removed or that blank space has been detected and the document will be reformatted or reorganized to fill that space. At step 465, and in response, a confirmation can be received through the messaging channel 410 from the mobile device of the user of the MFP 112. This confirmation can comprise an acknowledgement from the user indicating that the at least one portion of text within the document identified as sensitive information or the blank spaces can be removed from the document.

At step 470, the MFP 112 can remove the text within the document identified as sensitive information and/or the blank spaces. For example, the sensitive information can be replaced or overwritten with obscuring characters or marks, e.g., redacted. Additionally, or alternatively, the document can be reformatted to substantially remove or fill the detected blank portions, if any. For example, blank pages can be removed, extra carriage returns can be removed, images and/or text within the document can be enlarged and/or reduced in size, etc. in order to more efficiently use space on as few pages as possible. At step 475, dynamically adapting the content of the document can further comprise sending an SMS, MMS, IM, or other such message to the mobile device of the user indicating options for fitting content to a page, e.g., indicating that a blank page can be removed or that content can be shifted or moved to fit on one page instead of two, etc. and ask for confirmation that such a change is acceptable. At step 480, a confirmation or a selection of options for reformatting the document can be received from the mobile device in response. At step 485, based on this confirmation and/or removal, a job for the document can be regenerated and the document can be printed or scanned. At step 490, a notification can be provided to the mobile device of the user of the MFP through the messaging channel 410 upon completion of the function(s) of the MFP.

Figure 5:
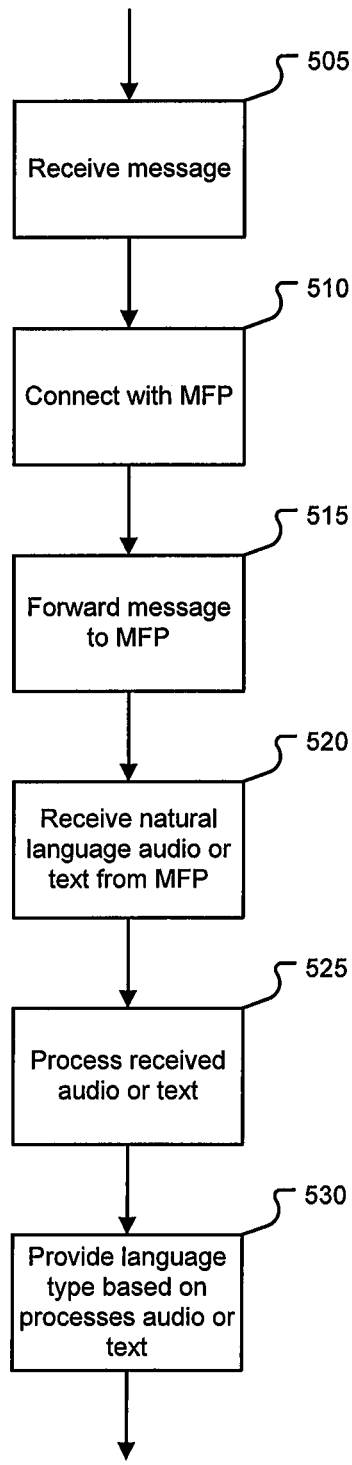
FIG. 5 is a flowchart illustrating exemplary cloud service processes for supporting the detection and formatting of sensitive information in a multi-function printer according to one embodiment of the present disclosure.

FIG. 5 is a flowchart illustrating exemplary cloud service processes for supporting the detection and formatting of sensitive information in an MFP according to one embodiment of the present disclosure. At step 505, as illustrated in this example, the one or more servers of the cloud service introduced above can receive a message from a mobile device. The message can comprise a natural language text or voice message to the one or more servers requesting initiation of one or more functions of the MFP. At step 510, and in response to receiving the message, the servers can open a connection with the MFP. At step 515, the server can forward the natural language text or voice message received from the mobile device to the MFP.

As noted above and as will be described further below, the MFP can extract and return text data or audio data of the text or voice message. Generally speaking, text data can comprise, for example, a text string corresponding to and including a command or request for functions of the MFP. Similarly, audio data can comprise an audio clip corresponding to and including such a command or request. At step 520, the one or more servers can receive the text data or audio data from the MFP. At step 525, the one or more servers can perform natural language processing on the text data or audio data to generate information indicating a language type for one or more portions of text within a document, and forward the generated information to the MFP.

For example, the text data or audio data can be processed according to one or more NLP functions to determine or identify an MFP function to be performed, e.g., print, scan, copy, fax or any other one or more functions, alone or in combination, and a document upon which it is to be performed, a destination to which the document is to be sent, etc. Based on this determination, sensitive information can be detected by further processing the subject document. This further processing can comprise, for example, applying one or more heuristics, algorithms, rules, etc. defining and identifying information that is subject to some level of control, i.e., is sensitive, private, controlled, etc. In such cases, the identified sensitive information can be tagged with metadata or otherwise marked to indicate that content is sensitive information. At step 530, this indication of language type can be provided to the MFP. In other embodiments, this information provided to the MFP can additionally or alternatively comprise, for example, a dictionary of keywords identified as sensitive, rules defining sensitive information or which can be applied by the MFP to identify sensitive information, heuristics which can be applied and/or algorithms which can be executed by the MFP to detect sensitive information, etc.

Figure 6:
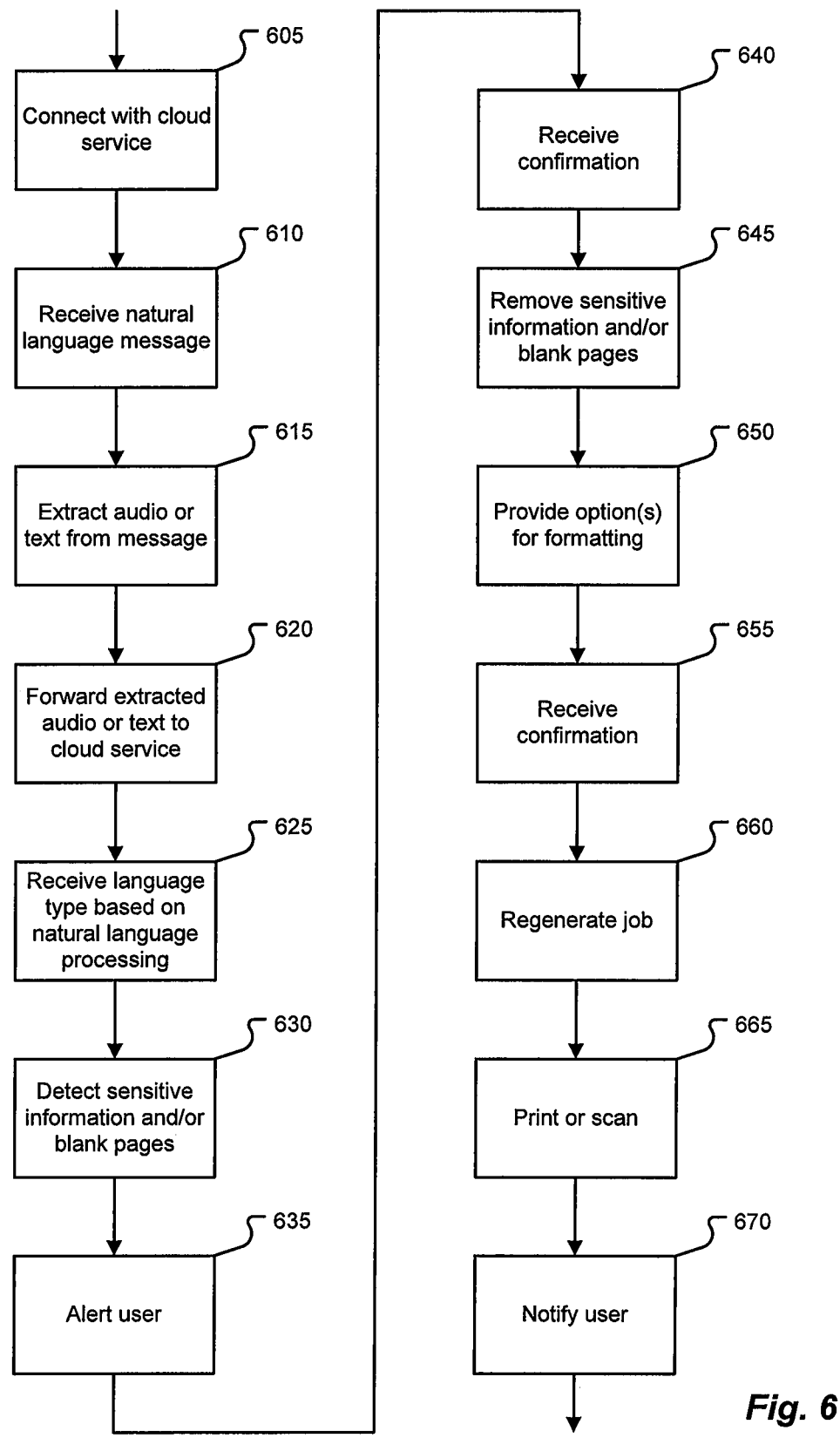
FIG. 6 is a flowchart illustrating exemplary local processes for detecting and formatting sensitive information in a multi-function printer according to one embodiment of the present disclosure.

FIG. 6 is a flowchart illustrating exemplary local processes for detecting and formatting sensitive information in an MFP according to one embodiment of the present disclosure. At step 605, accessing and controlling functions of the MFP can begin with connecting the MFP via a network with one or more servers providing a cloud service as described above. At step 610, once connected, a text or voice message expressed in natural language can be received from the one or more servers. As noted, the text or voice message can be received by the one or more servers from a mobile device of the user of the MFP and can include a natural language expression requesting access to or control of the printing and/or scanning functions of the MFP. At step 615, text data or audio data of the received text or voice message can be extracted from the message. At step 620, the extracted text data or audio data of the received text or voice message can be forwarded to the one or more servers for further processing. That is, portions of the natural language expression in the received text or voice message can be identified as relevant and/or particularly directed to access to or control of the printing and/or scanning functions of the MFP. This identification can be based, for example, on searching text, if any, of the received message for particular, predefined keywords, characters, or other indications of commands or requests to the MFP. Similarly, pre-processing of a voice message can comprise identifying keywords or utterances predefined as indicating a command or request to the MFP. Once identified, the corresponding text data, e.g., a text string corresponding to and including the command or request, or audio data, e.g., an audio clip corresponding to and including the command or request, can be copied or otherwise extracted from the received message and provided to the servers for further natural language and/or other processing.

At step 625, information indicating a language type for one or more portions of text within a document can be received from the one or more servers. This information can comprise, for example, a dictionary of keywords identified as sensitive, rules defining sensitive information or which can be applied to identify sensitive information, heuristics which can be applied to identify sensitive information, metadata marking or otherwise identifying document content as sensitive, etc. Based on the information indicating the language type for the one or more portions of text or content of the document content of the document dynamically adapting and one or more functions can be performed using the dynamically adapted content of the document.

At step 630, dynamically adapting the content of the document based on the language type for the one or more portions of text or content of the document and performing the one or more functions can comprise detecting at least one portion of text within the document identified as sensitive information based on the language type for the at least one portion. In some cases, detecting at least one portion of text within the document identified as sensitive information further can comprise performing an Optical Character Recognition (OCR) process on the document. Additionally, or alternatively, detecting at least one portion of text within the document identified as sensitive information further comprises performing a text search on contents of the document using one or more dictionaries or one or more heuristics obtained from the one or more servers. According to one embodiment, dynamically adapting the content of the document based on the language type for the one or more portions of text or content of the document and performing the one or more functions can additionally or alternatively comprise detecting at least one blank portion of the document.

At step 635, an alert can be provided to the mobile device of the user of the MFP indicating that the at least one portion of text within the document identified as sensitive information and/or blank spaces has been detected. Additionally, or alternatively, an alert can be provided to one or more persons other than the user of the MFP that the at least one portion of text within the document identified as sensitive information or blank space has been detected. For example, an alert message such as an SMS, MMS, IM, or other such message may be sent to the mobile device of the user indicating that sensitive information such as a social security number or company secret information has been detected and will be removed or that blank space has been detected and the document will be reformatted or reorganized to fill that space. In other cases, a similar message can also or instead be sent to another person such as a supervisor or manager to alert that person to an attempt to print such information. At step 640, a confirmation can be received from the mobile device of the user of the MFP or other person. This confirmation can comprise an acknowledgement from the user indicating that the at least one portion of text within the document identified as sensitive information or the blank spaces can be removed from the document. In other cases, this confirmation can be an indication from another person such as a supervisor or manager that the document can be printed or scanned after the sensitive information has been removed.

At step 645, dynamically adapting the content of the document based on the language type for the one or more portions of text or content of the document and performing the one or more functions can then further comprise removing the text within the document identified as sensitive information and/or the blank spaces. For example, the sensitive information can be replaced or overwritten with obscuring characters or marks, e.g., redacted. Additionally, or alternatively, the document can be reformatted to substantially remove or fill the detected blank portions, if any. For example, blank pages can be removed, extra carriage returns can be removed, images and/or text within the document can be enlarged and/or reduced in size, etc. in order to more efficiently use space on as few pages as possible. At step 650, dynamically adapting the content of the document can further comprise providing to the mobile device of the user of the MFP one or more options for reformatting the document. For example, an SMS, MMS, IM, or other such message may be sent to the mobile device of the user indicating that a blank page can be removed or that content can be shifted or moved to fit on one page instead of two, etc. and ask for confirmation that such a change is acceptable. This message may include, in some cases, options for reformatting such as no change, remove blank pages only, remove extra carriage returns, etc. At step 655, if such a message is provided 650, a confirmation or a selection of options for reformatting the document can be received from the mobile device in response. At step 660, based on receiving this confirmation and/or removal of the sensitive information, a job for the document can be regenerated. At step 665, the regenerated job can be printed or scanned. At step 670, a notification can be provided to the user upon completion of the function(s) of the MFP. For example, an SMS, MMS, IM, or other such message may be sent to the mobile device of the user indicating that job has been finished and the documents may be picked up from the MFP.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A Multi-Function Printer (MFP) comprising:
a processor; and
a memory coupled with and readable by the processor and having stored therein a set of instructions which, when executed by the processor, causes the processor to control functions of the MFP by:

connecting via a network with one or more servers providing one or more cloud-based services, the one or more cloud-based services including a first service executing a bot framework service on a first server and a second service executing a natural language processing service on a second server different from the first server;

receiving, from the one or more servers executing the first service, a text or voice message expressed in natural language and received by the one or more servers from a mobile device of the user of the MFP;

extracting text data or audio data of the received text or voice message;

forwarding the extracted text data or audio data of the received text or voice message to the one or more servers executing the second service;

receiving, from the one or more servers executing the second service, information indicating a language type for one or more portions of text within a document;

dynamically adapting content of the document based on the language type for the one or more portions of text or content of the document; and performing one or more functions using the dynamically adapted content of the document.

2. The MFP of claim 1, wherein dynamically adapting the content of the document based on the language type for the one or more portions of text or content of the document and performing the one or more functions comprise:

detecting at least one portion of text within the document identified as sensitive information based on the language type for the at least one portion;

removing the at least one portion of text within the document identified as sensitive information; and printing or scanning the document.

3. The MFP of claim 2, wherein detecting at least one portion of text within the document identified as sensitive information further comprises performing an Optical Character Recognition (OCR) process on the document.

4. The MFP of claim 2, wherein detecting at least one portion of text within the document identified as sensitive information further comprises performing a text search on contents of the document using one or more heuristics obtained from the one or more servers.

5. The MFP of claim 2, wherein dynamically adapting the content of the document based on the language type for the one or more portions of text or content of the document and performing the one or more functions further comprise:

providing to the mobile device of the user of the MFP an alert that the at least one portion of text within the document identified as sensitive information has been detected; and receiving from the mobile device of the user of the MFP a confirmation that the at least one portion of text within the document identified as sensitive information is permitted to be removed from the document.

6. The MFP of claim 5, wherein dynamically adapting the content of the document based on the language type for the one or more portions of text or content of the document and performing the one or more functions further comprise providing an alert to a supervisor of the user of the MFP informing the supervisor of an unauthorized use of the MFP and indicating that the at least one portion of text within the document identified as sensitive information has been detected.

7. The MFP of claim 1, wherein dynamically adapting the content of the document based on the language type for the one or more portions of text or content of the document and performing the one or more functions comprise:

detecting at least one blank portion of the document;

reformatting the document to substantially remove or fill the detected at least one blank portion; and printing or scanning the reformatted document.

8. The MFP of claim 7, wherein detecting at least one blank portion of the document and reformatting the document to substantially remove or fill the detected at least one blank portion comprises:

providing to the mobile device of the user of the MFP one or more options for reformatting the document, the one or more options comprising one or more of an option to print with no charge, an option to remove blank pages, or an option to remove extra carriage returns;

receiving from the mobile device of the user of the MFP a selection of at least one of the one or more options for reformatting the document; and regenerating a job for the document based on the received selection of at least one of the one or more options for reformatting the document.

9. A system comprising:

a mobile device;

one or more servers communicatively coupled with the mobile device, the one or more servers providing one or more cloud-based services including a first service executing a bot framework service on a first server and a second service executing a natural language processing service on a second server different from the first server; and a Multi-Function Printer (MFP) communicatively coupled with the mobile device and the one or more servers, wherein:

the mobile device sends a natural language text or voice message to the one or more servers executing the first service requesting initiation of one or more functions of the MFP, the one or more servers executing the first service receive the natural language text or voice message from the mobile device, open a connection with the MFP, and forward the natural language text or voice message received from the mobile device to the MFP, the MFP receives the natural language text or voice message forwarded from the one or more servers executing the first service, extracts text data or audio data of the received text or voice message, and forwards the extracted text data or audio data of the received text or voice message to the one or more servers executing the second service, the one or more servers executing the second service receive the text or audio data from the MFP, perform natural language processing on the text or audio data to generate information indicating a language type for one or more portions of text within a document, and forward the generated information to the MFP, and the MFP receives the information indicating a language type for one or more portions of text within the document from the one or more servers executing the second service, dynamically adapts content of the document based on the language type for the one or more portions of text or content of the document, and performs one or more functions using the dynamically adapted content of the document.

10. The system of claim 9, wherein dynamically adapting the content of the document based on the language type for the one or more portions of text or content of the document and performing the one or more functions comprise:

detecting at least one portion of text within the document identified as sensitive information based on the language type for the at least one portion;

removing the at least one portion of text within the document identified as sensitive information; and printing or scanning the document.

11. The system of claim 10, wherein detecting at least one portion of text within the document identified as sensitive information further comprises performing an Optical Character Recognition (OCR) process on the document.

12. The system of claim 10, wherein detecting at least one portion of text within the document identified as sensitive information further comprises performing a text search on contents of the document using one or more heuristics obtained from the one or more servers.

13. The system of claim 10, wherein the MFP further provides to the mobile device an alert that the at least one portion of text within the document identified as sensitive information has been detected and receives from the mobile device a confirmation that the at least one portion of text within the document identified as sensitive information may be removed from the document.

14. The system of claim 13, wherein the MFP further provides an alert to a supervisor of the user of the MFP informing the supervisor of an unauthorized use of the MFP and indicating that the at least one portion of text within the document identified as sensitive information has been detected.

15. The system of claim 9, wherein dynamically adapting the content of the document based on the language type for the one or more portions of text or content of the document and performing the one or more functions comprises:

detecting at least one blank portion of the document;

reformatting the document to substantially remove or fill the detected at least one blank portion; and printing or scanning the reformatted document.

16. The system of claim 15, wherein detecting at least one blank portion of the document and reformatting the document to substantially remove or fill the detected at least one blank portion comprises:

providing to the mobile device one or more options for reformatting the document, the one or more options comprising one or more of an option to print with no charge, an option to remove blank pages, or an option to remove extra carriage returns;

receiving from the mobile device a selection of at least one of the one or more options for reformatting the document; and regenerating a job for the document based on the received selection of at least one of the one or more options for reformatting the document.

17. A method for controlling functions of a Multi-Function Printer (MFP), the method comprising:

receiving, by one or more servers executing a bot framework service on a first server, a natural language text or voice message from a mobile device, the text or voice message requesting initiation of one or more functions of the MFP;

opening, by the one or more servers executing the bot framework service, a connection with the MFP;

forwarding, by the one or more servers executing the bot framework service, the natural language text or voice message received from the mobile device to the MFP, receiving, by the MFP, the natural language text or voice message from the one or more servers executing the bot framework service;

extracting, by the MFP, text data or audio data of the received text or voice message;

forwarding, by the MFP to one or more servers executing a natural language processing service on a second server different from the first server, the extracted text data or audio data of the received text or voice message;

receiving, by the one or more servers executing the natural language processing service, the text or audio data from the MFP;

performing, by the one or more servers executing the natural language processing service, natural language processing on the text or audio data to generate information indicating a language type for one or more portions of text within a document;

forwarding, by the one or more servers executing the natural language processing service, the generated information to the MFP;

receiving, by the MFP from the one or more servers executing the natural language processing service, the information indicating the language type for the one or more portions of the text within the document;

dynamically adapting, by the MFP, content of the document based on the language type for the one or more portions of text or content of the document; and performing, by the MFP, one or more functions using the dynamically adapted content of the document.

18. The method of claim 17, wherein dynamically adapting the content of the document based on the language type for the one or more portions of text or content of the document and performing the one or more functions comprise:

detecting at least one portion of text within the document identified as sensitive information based on the language type for the at least one portion;

removing the at least one portion of text within the document identified as sensitive information; and printing or scanning the document.

19. The method of claim 18, wherein dynamically adapting the content of the document based on the language type for the one or more portions of text or content of the document and performing the one or more functions further comprise:

providing, by the MFP to the mobile device, an alert that the at least one portion of text within the document identified as sensitive information has been detected; and receiving, by the MFP from the mobile device; a confirmation that the at least one portion of text within the document identified as sensitive information is permitted to be removed from the document.

20. The method of claim 17, wherein dynamically adapting the content of the document based on the language type for the one or more portions of text or content of the document and performing the one or more functions comprise:

providing, by the MFP to the mobile device, one or more options for reformatting the document, the one or more options comprising one or more of an option to print with no charge, an option to remove blank pages, or an option to remove extra carriage returns;

receiving, by the MFP from the mobile device, a selection of at least one of the one or more options for reformatting the document;

regenerating, by the MFP, a job for the document based on the received selection of at least one of the one or more options for reformatting the document; and printing or scanning, by the MFP, the regenerated job for the document.

\* \* \* \* \*